Dec. 22, 1931.  R. W. ANDREASSON  1,837,392
UNIVERSAL DRILL HOLDER
Filed March 4, 1930   2 Sheets-Sheet 1
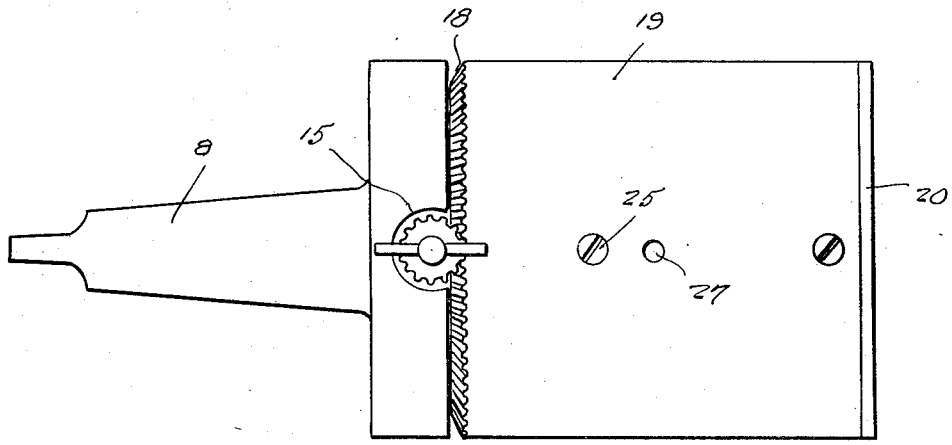
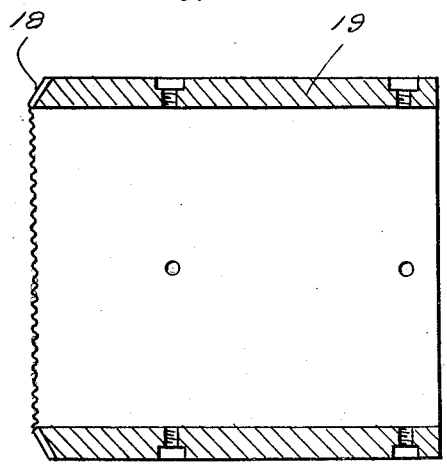
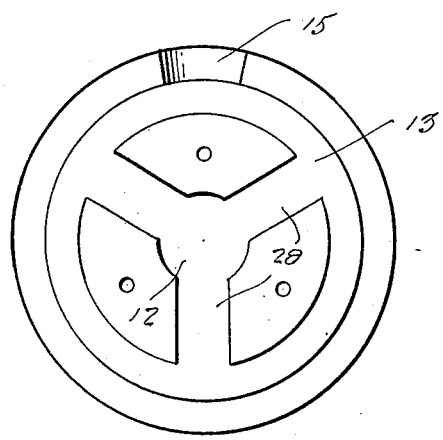
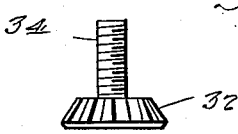
Inventor
R. W. Andreasson
By Clarence A. O'Brien
Attorney Dec. 22, 1931.  R. W. ANDREASSON  1,837,392
UNIVERSAL DRILL HOLDER
Filed March 4, 1930    2 Sheets-Sheet 2
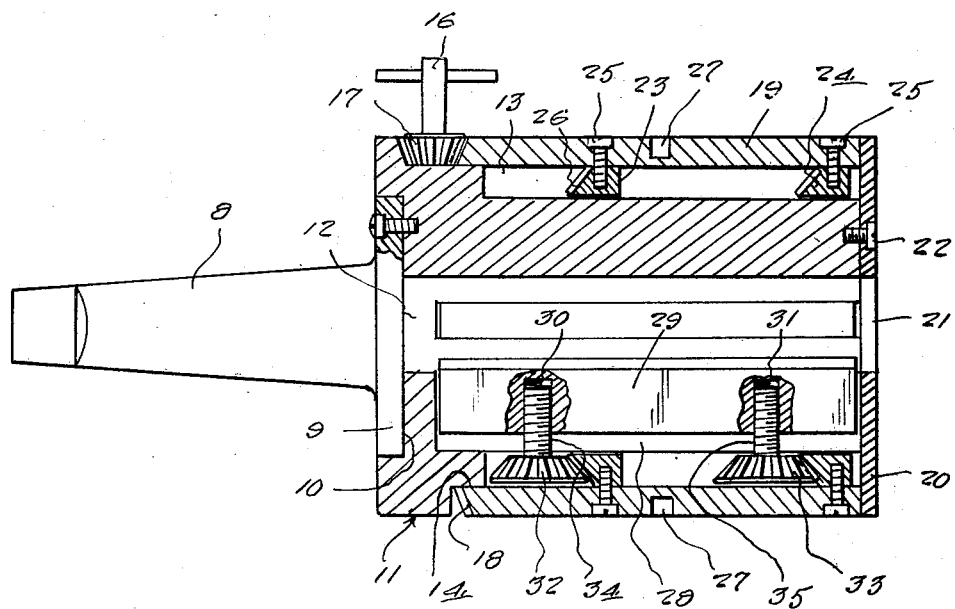
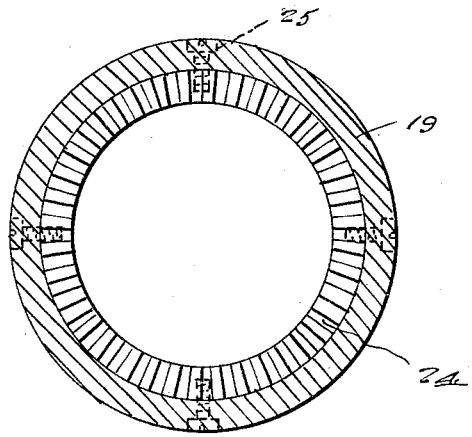 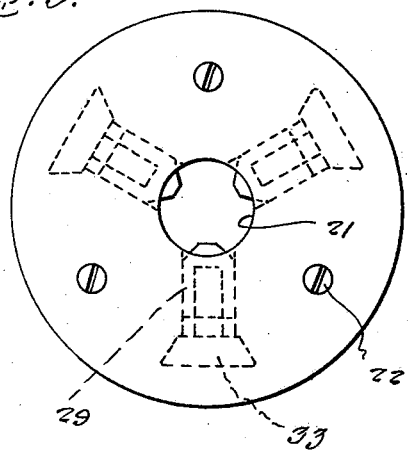
Inventor
R. W. Andreasson
By Clarence A. O'Brien
Attorney Patented Dec. 22, 1931

1,837,392

UNITED STATES PATENT OFFICE

RUDOLF WILLIAM ANDREASSON, OF DETROIT, MICHIGAN

UNIVERSAL DRILL HOLDER

Application filed March 4, 1930. Serial No. 433,166.

This invention relates to drill holders, and an object of the invention is to provide a drill holder that has solid gripping jaws to grasp the drill shank so as to hold the drill firmly under heavy stress.

Further objects of the invention are to provide a drill holder of the character referred to, that is strong, compact and durable, thoroughly reliable for its intended use, very simple in its method of assembly, very simple to operate, and comparatively inexpensive to manufacture.

With the foregoing and other objects in view, the invention consists of a novel construction, combination and arrangement of parts as will be hereinafter more specifically described and illustrated in the accompanying drawings, wherein is disclosed an embodiment of the invention, it is to be understood that changes, variations, and modifications may be resorted to without departing from the spirit of the claims hereto appended.

In the drawings wherein like reference characters denote corresponding parts throughout the several views:—

Figure 1 is a side elevation of the drill holder in accordance with the present invention, Fig. 2 is a detail longitudinal section thereof partly broken away, and Fig. 3 is a front elevation of the drill holder, Fig. 4 is a front elevation with the cover plate removed, Fig. 5 is a diametric section through the sleeve, Fig. 6 is a diametric section through the sleeves looking at the beveled face of one of the ring gears, and Fig. 7 is a side elevation of the jaw elevating gear.

Referring to the drawings in detail, 8 indicates a shank that is adapted to fit into the conventional socket on a drill press. The inner end of the shank 8 is prvoided with an annular lateral flange that is seated in a recess 10 countersunk in the end of the spindle indicated generally at 11.

The spindle is a solid cylinder formed with an axial bore 12 extending throughout its entire length. The major portion of the peripheral face of the spindle is provided with a pocket 13 that extends from the outer end of the spindle to a point adjacent the inner end thereof.

The pocket 13 terminates adjacent the inner end of the spindle in a stepped shoulder 14. The peripheral face of the spindle adjacent the inner end thereof is provided with a segmental shaped recess 15 that communicates with one set of the shoulders 14 which is set nearer the periphery of the spindle.

The recess 15 provides a space for inserting the operating key 16 that has a beveled gear 17 on its inner end and this beveled gear is adapted to engage in teeth 18 on the inner end of a sleeve 19. The walls of the sleeve 19 are of the same thickness as the depth of the shoulder 14 and the inner end of this sleeve 19 is slidably supported on the counter step of the shoulder.

The sleeve 19 is co-extensive with the pocket 13 and terminates at its outer end flush with the end of the spindle. A cover plate 20 having an opening 21 in the center thereof registers with the bore 12 and this cover plate is secured to the spindle by means of a plurality of screws 22.

The cover plate 20 is circular and the periphery thereof terminates flush with the outer periphery of the sleeve 19, thereby closing the outer end of the pocket 13. The outer end of sleeve 19 slides on the inner margin of the cover plate 20.

To the inner face of sleeve 19, is secured a pair of ring gears 23, 24 by means of set screws 25. On the inner face of each ring gear, there are bevelled teeth 26 and these ring gears rotate about intermediate portions of the spindle within the pocket 13. The peripheral face of the sleeve 19 intermediate the ends thereof, is provided with circumferentially spaced cavities 27 that receive the ends of a spanner wrench in event it is desired to dispense with the operating key 16.

The walls of the spindle about the bore 12 are provided with a plurality of radially disposed slots or grooves 28 that are preferably three in number.

Preferably, the grooves are approximately 120° apart, and communicate at their outer ends with pocket 13. Slidable radially in the grooves 28 are the jaws 29 that are in the form of elongated rectangular bars.

Each of the gripping jaws has a pair of sockets 30, 31, extending transversely thereof, from the outer faces. For each jaw 29 there are a pair of beveled gears 32, 33 rotatably supported in the pocket 13 and having the teeth thereon engageable with the teeth 26 on the ring gears 23, 24.

Projecting radially inwardly from the inner face of each beveled gear 32, 33, are threaded shanks 34, 35, that threadably engage in the sockets 30, 31 in each jaw. When the threaded shanks 34, 35 are rotated in one direction or the other, the jaws move radially inwardly or outwardly to grip the drill shanks, not shown in the drawings, that is inserted in the bore 12 of the spindle.

It will be seen that these rotations of the sleeve 19 rotates the ring gears 23, 24, which in turn rotate the pairs of beveled gears 32, 33 on each jaw 29 whereby the jaws are moved radially in their respective grooves, 28.

The present embodiment of the invention has been disclosed in considerable detail merely for purpose of exemplification, since in actual practice, it attains the features of advantage enumerated as desirable in the statement of the invention and the above description.

It is to be understood that by describing in detail herein any particular form, structure, or arrangement, it is not intended to limit the invention beyond the terms of the several claims, or the requirements of the prior art.

Having thus described my invention, what I claim as new is:—

1. A drill holder comprising a spindle having a central bore and a peripheral pocket, a sleeve rotatable on the spindle and having ring gears secured to the inner face thereof movable in said pocket, said spindle further having radially projecting grooves leading from the central bore and communicating with said pocket, gripping jaws movable in said grooves, gears rotatably supported in said pocket and engageable with said ring gears, means on the said gears engageable with said jaws for moving said jaws, a shank secured to and projecting from one end of the spindle, and means for turning the sleeve with respect to the spindle.

2. A drill holder comprising a spindle having a central bore and a peripheral pocket, a sleeve rotatable on the spindle and having ring gears secured to the inner face thereof movable in said pocket, said spindle further having radially projecting grooves leading from the central bore and communicating with said pocket, gripping jaws movable in said grooves, gears rotatably supported in said pocket and engageable with said ring gears, means on the said gears engageable with said jaws for moving said jaws, a shank secured to and projecting from one end of the spindle, means for turning the sleeve with respect to the spindle, said first-mentioned means consisting of a threaded shank on each of said gears, and said jaws each formed with a threaded socket to receive one of said threaded shanks.

3. A drill holder comprising a spindle having a central bore and a peripheral pocket, a sleeve rotatable on the spindle and having ring gears secured to the inner face thereof movable in said pocket, said spindle further having radially projecting grooves leading from the central bore, and communicating with said pocket, gripping jaws movable in said grooves, gears rotatably supported in said pocket and engageable with said ring gears, means on the said gears engageable with said jaws for moving said jaws, a shank secured to and projecting from one end of the spindle, means for turning the sleeve with respect to the spindle, said first-mentioned means consisting of a threaded shank on each of said gears, said jaws each formed with a threaded socket to receive one of said threaded shanks, said pocket terminating at its inner end of said spindle in a stepped shoulder to provide on the outer step a bearing for the inner end of the sleeve.

4. A drill holder comprising a spindle having a central bore and a peripheral pocket, a sleeve rotatable on the spindle and having ring gears secured to the inner face thereof movable in said pocket, said spindle further having radially projecting grooves leading from the central bore, and communicating with said pocket, gripping jaws movable in said grooves, gears rotatably supported in said pocket and engageable with said ring gears, means on the said gears engageable with said jaws for moving said jaws, a shank secured to and projecting from one end of the spindle, means for turning the sleeve with respect to the spindle, said first-mentioned means consisting of a threaded shank on each of said gears, said jaws each formed with a threaded socket to receive one of said threaded shanks, said pocket terminating at its inner end of said spindle in a stepped shoulder to provide on the outer step a bearing for the inner end of the sleeve, and a centrally apertured cover plate disposed over the outer end of the spindle for sealing the pocket and providing a bearing for the outer end of the sleeve.

In testimony whereof I affix my signature.

RUDOLF WILLIAM ANDREASSON.